United States Patent [19]

Habata et al.

[11] 4,366,324

[45] Dec. 28, 1982

[54] PROCESS FOR CONCURRENT PREPARATION OF ORGANOSILOXANES AND METHYL CHLORIDE

[75] Inventors: Kiichi Habata; Kesazi Ichikawa, both of Takasaki; Mutsuo Shimizu, Annaka, all of Japan

[73] Assignee: Shin-Etsu Chemical Co. Ltd., Tokyo, Japan

[21] Appl. No.: 322,552

[22] Filed: Nov. 18, 1981

[30] Foreign Application Priority Data

Nov. 25, 1980 [JP] Japan ............................. 55-165533

[51] Int. Cl.$^3$ ............................................. C07F 7/08
[52] U.S. Cl. .................................. 556/460; 556/450; 556/459; 556/461; 570/261
[58] Field of Search ................ 556/460, 461, 450, 459

[56] References Cited

U.S. PATENT DOCUMENTS

| | | | |
|---|---|---|---|
| 2,556,897 | 6/1951 | Bidaud | 556/450 |
| 3,432,538 | 3/1969 | Curry | 556/460 |
| 3,792,071 | 2/1974 | Nitzsche et al. | 556/450 X |
| 3,803,195 | 4/1974 | Nitzsche et al. | 556/459 |
| 4,032,557 | 6/1977 | Spörk et al. | 556/459 |
| 4,060,537 | 11/1977 | Maass et al. | 556/460 |
| 4,108,882 | 8/1978 | Mahone | 556/460 |

*Primary Examiner*—Paul F. Shaver
*Attorney, Agent, or Firm*—Toren, McGeady & Stanger

[57] ABSTRACT

The invention provides a novel continuous process for concurrently producing methyl chloride and organosiloxanes by the reaction of an organochlorosilane and methyl alcohol in an aqueous reaction medium at 70° to 150° C. Different from conventional processes, the aqueous reaction medium contains no catalyst so that the problems inherent to the use of a large amount of a catalyst can be avoided. In the inventive process, the feed rates of the reactants are controlled so as to keep the concentration of hydrogen chloride in the aqueous reaction medium not to exceed the azeotropic concentration thereof at the temperature and under the pressure of operation. These conditions are critical to reduce the loss of hydrogen chloride by dissipation into the gaseous phase resulting in a remarkably high yield of methyl chloride from the standpoint of both the conversion of chlorine content and the space-time yield of the reaction vessel. The inventive process is advantageous also in the excellent quality of the organosiloxane product and markedly decreased formation of dimethyl ether as an undesirable by-product.

10 Claims, 1 Drawing Figure

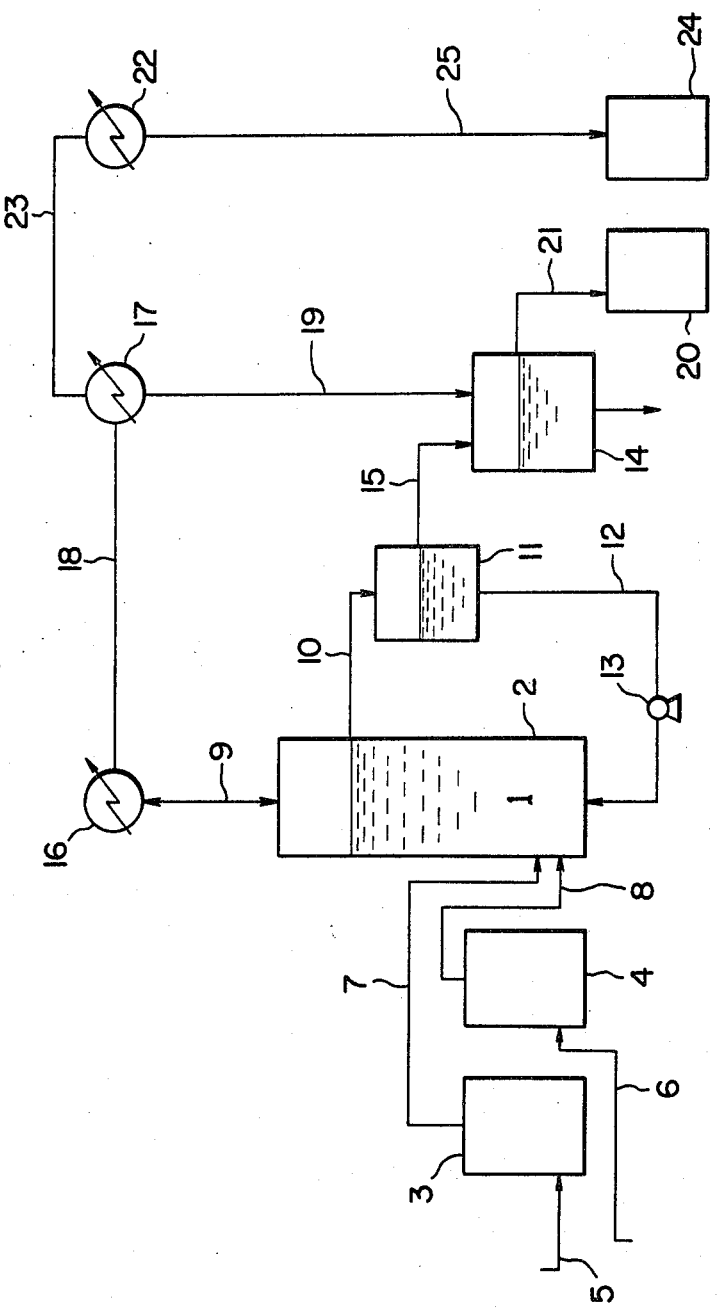
FIGURE

PROCESS FOR CONCURRENT PREPARATION OF ORGANOSILOXANES AND METHYL CHLORIDE

BACKGROUND OF THE INVENTION

The present invention relates to a process for concurrently preparing organosiloxanes and methyl chloride from a corresponding organochlorosilane and methyl alcohol by the reaction expressed by the equation

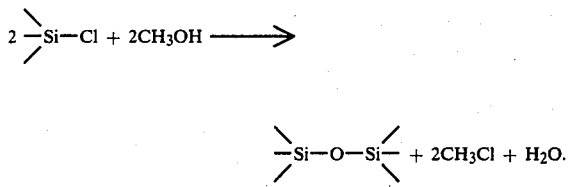

$$2 \diagup_{\diagdown}\!\!Si\!-\!Cl + 2CH_3OH \longrightarrow \diagdown_{\diagup}\!\!Si\!-\!O\!-\!Si\!\diagup_{\diagdown} + 2CH_3Cl + H_2O.$$

As is well known, the first and basic step in the production of various kinds of silicones, i.e. polymeric products mainly of organopolysiloxanes, is the hydrolysis of one or a mixture of organochlorosilanes to convert the silicon-bonded chlorine atoms to silanol groups followed by the silanol condensation to give siloxane linkages. the primary product obtained by the above hydrolysis and condensation is usually a mixture of relatively low-molecular organopolysiloxanes (hereinafter referred to as organosiloxanes) and such organosiloxanes are important intermediates for the preparation of high-molecular silicone products by the polycondensation or siloxane rearrangement according to need.

A problem in the above described hydrolysis-condensation reaction of organochlorosilanes is the disposal of the by-product hydrogen chloride formed by the hydrolysis of the silicon-bonded chlorine atoms with water. The major route for the utilization of the by-product hydrogen chloride is for the production of methyl chloride in a separate process in which hydrogen chloride is reacted with methyl alcohol to give water and methyl chloride, which latter is further reacted with metallic silicon to give methylchlorosilanes. Thus, a circuit is formed for the circulation of chlorine through the route of methyl chloride to methylchlorosilanes to by-product hydrogen chloride to methyl chloride. In any way, organosiloxanes and methyl chloride are produced in two separate processes in the conventional silicone technology.

In contrast to the above described conventional processes, there are also known processes for the concurrent or one-step preparation of organosiloxanes and an alkyl halide by the direct reaction of an organohalogenosilane and an alkanol or, in particular, of organosiloxanes and methyl chloride by the direct reaction of an organochlorosilane and methyl alcohol. In theses processes, the chlorine is directly converted to methyl chloride so that the overall costs for the production of silicones can greatly be reduced owing to the absence of the process or facilities for the utilization of the by-product hydrogen chloride such as the separate preparation of methyl chloride by the reaction with methyl alcohol. In addition, advantages are obtained in these one-step processes that the formation of large volumes of hydrochloric acid can be avoided owing to the absence of the step of hydrolysis contributing to the solution of the problem of waste acid disposal and to the saving of energy required for the reaction as well as to the decrease of the loss of materials such as chlorine and methyl alcohol.

Notwithstanding the above described great advantages in principle in the one-step process, the process has not yet been so prevalent in the silicone industry because several problems must be solved before the process is industrially practiced. The principal problems in this process are that the direct alcoholysis reaction between an organochlorosilane and methyl alcohol proceeds at a relatively low velocity so that the productivity of the process is not always satisfactory taking long time, that undesirable side reactions take place to form by-products such as dimethyl ether leading to the decrease in the yields of the organosiloxanes and methyl chloride, that sufficiently high reaction velocity is obtained only by the use of a catalyst and the contamination of the products with the catalyst is sometimes unavoidable and that the facilities for the reaction cannot be so small that the cost for the process is not so low as desired due to the large investment for the facilities.

There have been, of course, made many attempts to solve the above described problems in the one-step manufacturing of organosiloxanes and methyl chloride to establish the practicability of the process. For example, U.S. Pat. No. 2,556,897 describes a process in which a liquid mixture of a methylhalosilane, e.g. dimethyldichlorosilane, and anhydrous methyl alcohol in an excess amount over stoichiometry is kept at an elevated temperature of 40° to 60° C. so that methyl chloride as the reaction product is evolved out of the reaction mixture and collected. This method is simple but the reaction, which is carried out batch-wise, is relatively slow so that the reaction vessel necessarily should be very large when the method is to be practiced in an industrial scale. In addition, the reaction can never be complete, presumably, due to the use of a large volume of methyl alcohol so that the yield of the desired organosiloxanes is not sufficiently high.

U.S. Pat. No. 2,741,630 teaches a process for the vapor phase reaction of methyl alcohol and an alkylhalogenosilane, e.g. dimethyldichlorosilane, on a solid catalyst of zinc chloride supported on a silica gel as the carrier at a temperature of 175° C. or above. Such a high temperature and the use of a strong catalyst such as zinc chloride are not desirable because a side reaction of scission of the bond between the silicon atom and the carbon atom may take place resulting in an unsatisfactory quality of the organosiloxane product even if the yield of the organosiloxanes is not unduly low by suitably selecting the reaction conditions. Indeed, the methylsiloxane products obtained in an example contained only about 50% by weight of cyclic methylpolysiloxanes such as hexamethylcyclotrisiloxane, octamethylcyclotetrasiloxane and the like which are the most valuable constituents in the organosiloxane products.

In contrast to the above mentioned catalytic process, noncatalytic processes are also described, for example, in Japanese Patent Publication No. 50-11368 and U.S. Pat. No. 4,032,557 for the direct reaction of an organohalogenosilane and an alcohol to form organosiloxanes and an alkyl halide. According to the Japanese patent, the organohalogenosilane and the alcohol in liquid forms are introduced in counter-current into a bed formed of inert packings having a specific surface area of at least 0.1 m²/g at a temperature of 20° to 150° C. The disadvantages in this process are the low reaction velocity necessitating large-scale facilities when the process is practiced in an industrial scale and the low yield of the alkyl halide due to the loss of the hydrogen halide carried out by the water formed by the reaction.

U.S. Pat. No. 4,032,557 proposes an improvement for the above process by introducing dimethyldichlorosilane and methyl alcohol into a reactor containing at least one layer of packing material which is maintained at a temperature of from 60° C. to 150° C. to form an aqueous phase containing organosiloxanes, and thereafter separating the organosiloxanes from the aqueous phase, in which improvements are obtained by recycling into the reactor from 1 to 6 liters of the aqueous phase for each mole of the dimethyldichlorosilane introduced into the reactor and reacting the organosiloxanes separated from the aqueous phase with dimethyldichlorosilane in an amount from 2 to 10% by weight based on the weight of the organosiloxanes. Substantial improvements are obtained in this method in connection with the reaction velocity over the process described in the above mentioned Japanese patent but the problem of low yield of methyl chloride remains unsolved for the same reasons in addition to the disadvantages due to the further complicated facilities.

Apart from the above described processes for the direct reaction of an organochlorosilane and methyl alcohol in which the reactants either in the liquid or in the vapor phase are reacted without any reaction medium, there are also known processes for the reaction of an organochlorosilane and an alcohol in which the reactants are simultaneously introduced into an aqueous reaction medium to be reacted there.

For example, the process disclosed in Japanese Patent Kokai No. 52-78835 comprises reacting an organochlorosilane and methyl alcohol in an aqueous solution of a Lewis acid such as zinc chloride. It is noted that the reaction conditions described there are far from moderate. In an example, the concentration of zinc chloride in the aqueous solution is as high as 81% by weight and the reaction of dimethyldichlorosilane and methyl alcohol is carried out at 155° C. As a result of such reaction conditions, the amount of the by-product dimethyl ether is remarkably large in the volatile products in addition to the disadvantage of low productivity of the organosiloxanes that only about 2 g of oily organosiloxanes are obtained in each hour by use of a bubble column of 6.5 cm diameter and 110 cm length.

Further, Japanese Patent Kokai No. 54-63028 discloses a process for the direct reaction of an organochlorosilane and methyl alcohol in a reaction medium. In this case, the reaction medium is a melt of a quaternary ammonium salt such as N-methylpyridinium chloride. This process is also disadvantageous due to the low conversion of the chlorine content in the organochlorosilane to methyl chloride. In an example for the reaction of dimethyldichlorosilane with methyl alcohol, the conversion is only 76% by use of a single sparger column and a satisfactory conversion of about 99% is obtained only by the use of 4 sparger columns connected in series.

SUMMARY OF THE INVENTION

It is therefore an object of the present invention to provide a novel and improved continuous process for the concurrent production of methyl chloride and organosiloxanes by the direct reaction of an organochlorosilane and methyl alcohol without the use of any catalyst. A further object of the invention is, in the above mentioned reactions, to provide a means for obtaining a remarkably high productivity per unit volume of the reaction vessel per unit time or the so-called space-time yield in comparison with the prior art processes with decreased formation of dimethyl ether as an undesirable by-product as well as increased yield of methyl chloride and for producing the organosiloxane product containing low molecular or, in particular, cyclic organopolysiloxanes in an increased proportion. Another object of the invention is to provide a means, in the process of the above described type, for obtaining a markedly enhanced conversion of the chlorine content in the organochlorosilane into methyl chloride even by a single pass of the reactants through a relatively small reactor vessel.

That is, the process of the present invention for concurrently producing methyl chloride and organosiloxanes from an organochlorosilane and methyl alcohol comprises introducing simultaneously the organochlorosilane and methyl alcohol in such a proportion that the amount of the methyl alcohol to be introduced is substantially equimolar to the silicon-bonded chlorine atoms in the organochlorosilane into an aqueous reaction medium comprising methyl alcohol and hydrogen chloride kept at a temperature in the range from 70° to 150° C. and under a pressure of atmospheric or higher and contained in a reaction vessel at or near the bottom thereof, the rates of introduction of the methyl alcohol and the organochlorosilane being controlled such that the concentration of hydrogen chloride in the aqueous reaction medium in the vicinity of the surface thereof does not substantially exceed the azeotropic concentration at the temperature and under the pressure.

It is preferable in practicing the above described process of the prevent invention that the methyl alcohol and the organochlorosilane are introduced into the aqueous reaction medium in the gaseous state as vaporized or at least partially vaporized rather than in the liquid form so as to facilitate the temperature control in the above defined temperature range with minimized external heat supply to the reaction vessel.

The amount of water formed by the reaction of the organochlorosilane and methyl alcohol is continuously removed from the reaction system either as the uncondensed portion of the vapors in the partial refluxing or as the aqueous medium as such discharged out of the reaction vessel together with the liquid portion of the organosiloxane product.

BRIEF DESCRIPTION OF THE DRAWING

The FIGURE is a block diagram illustrating a typical flowsheet for practicing the process of the present invention.

DETAILED DESCRIPTION OF THE PREFERRED EMBODIMENTS

It is known that the formation of methyl chloride from methyl alcohol and hydrogen chloride is a remarkably slow reaction in comparison with the formation of organosiloxanes by the hydrolysis or alcoholysis of an organochlorosilane followed by the condensation reaction so that it is important to accelerate the formation of methyl chloride in order to increase the productivity or the space-time yield of the objective reaction. Although the use of a catalyst such as zinc chloride and quaternary ammonium salts is an effective menas to enahnce the reaction velocity for the formation of methyl chloride, it is very desirable to have an increased reaction velocity without the use of any catalyst owing to the difficult problems involved in the use of a catalyst as mentioned above.

It is also known that the velocity of formation of methyl chloride in the ternary system of water, methyl alcohol and hydrogen chloride is increased with the increase in the temperature of the reaction medium as well as the concentrations of the methyl alcohol and hydrogen chloride in the system. On the other hand, the increase of the concentrations of the methyl clcohol and hydrogen chloride necessarily results in the increased loss of these reactants by the dissipation into the gaseous phase as carried by the methyl chloride as the product with increased vapor pressures of them above the liquid reaction medium so that the yield of the methyl chloride decreases as a consequence. Moreover, the amount of dimethyl ether formed as the by-product increases with the increase in the concentration of methyl alcohol in the reaction medium.

The inventors have conducted extensive investigations with an object to discover the conditions with which the highest space-time yield and the highest conversion of the chlorine content into methyl chloride are obtained for the direct reaction of methyl alcohol and an organochlorosilane without the use of a catalyst to concurrently produce methyl chloride and organosiloxanes and unexpectedly arrived at the discovery that the best results are obtained when the reactants are introduced into an aqueous reaction medium comprising methyl alcohol and hydrogen chloride kept at a temperature in the range from 70° to 150° C. at such rates of introduction of them that the concentration of hydrogen chloride in the aqueous reaction medium does not substantially exceed the azeotropic concentration at the temperature and the pressure, in particular, at least in the vicinity of the surface of the liquid medium. It is further preferable that the methyl alcohol and the organochlorosilane are blown into the aqueous reaction medium at or near the bottom of the reaction vessel in the gaseous state so that the reaction proceeds to be completed before the bubbles of the vapors ascending in the aqueous reaction medium reach the surface.

The reason for the above described unexpectedly satisfactory results in respects of the high yield of methyl chloride and decreased formation of the by-product dimethyl ether as well as the high conversion of the chlorine content obtained by the inventive process is presumably as follows. When the organochlorosilane and methyl alcohol are introduced into the aqueous reaction medium in the gaseous state, the bubbles of their vapors ascend in the reaction medium and, on the way to the surface of the liquid, the organochlorosilane is rapidly subjected to the hydrolysis or alcoholysis reaction to form organosiloxanes and hydrogen chloride. This hydrogen chloride and the vapor of methyl alcohol in each of the bubbles are absorbed by and dissolved into the reaction medium through the gas-liquid interface so that the temperature and the concentrations of hydrogen chloride and methyl alcohol at or in the vicinity of the gas-liquid interface of the bubbles become higher than in the bulk of the reaction medium. Since the velocity of formation of methyl chloride in a liquid-phase reaction is markedly increased even by a slight increase in the concentrations of hydrogen chloride and methyl alcohol in the reaction medium, the velocity of the formation of methyl chloride is remarkably larger at or in the vicinity of the gas-liquid interface of the bubbles than in the bulk of the reaction medium so that the formation of methyl chloride is accelerated as a whole as a result of the localized increase of the velocity.

In each of the bubbles of the gaseous reactants introduced into the aqueous reaction medium at or near the bottom of the reaction vessel and ascending in the reaction medium, the vapors of the organochlorosilane and methyl alcohol are steadily absorbed by the reaction medium so that the temperature and the concentrations of hydrogen chloride and methyl alcohol at or in the vicinity of the gas-liquid interface of the bubbles gradually approach the temperature and concentrations in the bulk of the reaction medium and finally no differences are formed between them. Therefore, the amounts of hydrogen chloride and methyl alcohol dissipated as carried by the gaseous methyl chloride formed by the reaction are minimized with the shrinkage of the bubbles broken at the surface of the aqueous reaction medium so that an unexpectedly advantageous effect is obtained in the yield of the methyl chloride with a surprisingly high conversion of the chlorine content.

The situation is similar to the above when the reactants of the organochlorosilane and methyl alcohol are introduced into the aqueous reaction medium in the liquid form. In this case, the droplets of the reactants introduced into the reaction medium at or near the bottom of the reaction vessel ascend in the reaction medium and the relationships between the temperatures and concentrations of hydrogen chloride and methyl alcohol in the bulk of the reaction medium and at or in the vicinity of the surface of the droplets may be the same as in the case of the bubbles of the reactant vapors so that a higher yield of methyl chloride can be expected also in this case although the introduction of the liquid reactants is less preferable than the introduction of the reactant vapors for the reasons explained later.

The above explained fact that the reaction velocity for the formation of methyl chloride can be markedly increased over that in the homogeneous reaction medium without substantial increase in the temperature of and in the concentrations of hydrogen chloride and methyl alcohol in the aqueous reaction medium is a very important advantage of the inventive process resulting in the increase of the yield of methyl chloride without increase in the loss of hydrogen chloride and methyl alcohol by dissipation into the vapor phase and the formation of dimethyl ether as a by-product.

Concurrently with the formation of methyl chloride, organosiloxanes are produced as the other product of the inventive process.

It is in general advantageous that the organopolysiloxanes produced in this manner are composed of the polysiloxane molecules having molecular weights as low as possible. In particular, when a diorganodichlorosilane is used as the starting organochlorosilane, the organosiloxane product desirably contains as large as possible amounts of low molecular weight cyclic organopolysiloxanes such as hexaorganocyclotrisiloxane, octaorganocyclotetrasiloxane and the like. This is because an organosiloxane product composed of low molecular weight organopolysiloxanes has a lower viscosity than otherwise so that the separation of the organosiloxane product from the aqueous reaction medium can be effected more easily and the organosiloxanes having lower molecular weights can be purified by distillation while organosiloxanes having larger molecular weights can be subjected to the purification by distillation only after a suitable cracking treatment to reduce the molecular weight. It may be needless to say that the lower cyclic organopolysiloxanes mentioned above are the most important intermediate components in the organosiloxane products when the starting organochlorosilane is a diorganodichlorosilane.

In the conventional processes for the preparation of organosiloxanes by the hydrolysis of an organochlorosilane in an aqueous medium, the measures generally undertaken to increase the yield of the low molecular organopolysiloxanes in the organosiloxane product are, from the standpoint of preventing the polymerization of the molecules by the silanolic polycondensation following the hydrolysis of the organochlorosilane as far as possible, that (a) the reaction of the hydrolysis of the organochlorosilane is performed at a temperature as low as possible, (b) the concentration of hydrogen chloride in the aqueous medium for the hydrolysis is kept as low as possible, and (c) the concentration of methyl alcohol in the medium is kept high within a limit given by the undesirable side reaction of the formation of dimethyl ether taking place at high concentrations of methyl alcohol since the methoxy content in the organosiloxane product is increased at a higher concentration of methyl alcohol to give a favorable condition for preventing the silanol polycondensation.

In contradiction to the above requirements, the important conditions for increasing the productivity or the spare-time yield with increased reaction velocity in the process for the preparation of methyl chloride in an aqueous reaction medium composed of water, methyl alcohol and hydrogen chloride are that (a) the reaction temperature should be high enough, usually, in the range of from 100° to 130° C., much higher than the preferred temperature for the hydrolysis of organochlorosilanes, (b) the concentration of hydrogen chloride in the reaction medium should be kept as high as possible, and (c) the concentration of methyl alcohol in the reaction medium should be kept as high as possible though under the same limitation as mentioned above to prevent undue increase of the formation of dimethyl ether.

As is understood from the above description, the conditions for the optimization of the separate processes for the preparation of organosiloxanes and for the preparation of methyl chloride are in contradiction with each other in respect of the reaction temperature and the concentration of hydrogen chloride in the reaction media. It has been, therefore, a general understanding that the concurrent preparation of the organosiloxanes and methyl chloride from the organochlorosilane and methyl alcohol is never an industrially advantageous process falling between two stools due to the above described contradictory conditions. Unexpectedly and surprisingly, on the contrary, the present invention provides a novel means for the concurrent preparation of them in one step, according to which the organosiloxane product has a quality as satisfactory as those obtained in low-temperature hydrolysis notwithstanding the reaction conditions suitable for the formation of methyl chloride in a high space-time yield and with a high conversion of the chlorine content. It is very surprising that the above explained distribution of the localized concentration of the reactants at or near the surfaces of the vapor bubbles of liquid droplets is so effective as to remarkably increase the reaction velocity since it is in general a fair assumption that the volume of the aqueous reaction medium having increased concentrations of hydrogen chloride and methyl alcohol in the vicinity of the surface of the vapor bubbles or liquid droplets is too small to contribute to the increase of the overall reaction velocity with much larger velocities of the physical absorption or dissolution of the hydrogen chloride and methyl alcohol than the reaction velocity thereof.

As is described in the above, the principle of the inventive process is in the utilization of the unexpectedly enhanced reaction velocity in the localized reaction zones at or in the vicinity of the surface of the vapor bubbles or liquid droplets ascending in the aqueous reaction medium where the temperature as well as the concentrations of the hydrogen chloride and methyl alcohol are higher than in the bulk of the reaction medium.

The starting materials to be reacted in the inventive process are an organochlorosilane and methyl alcohol. The organic group or groups bonded to the silicon atom of the organochlorosilane can be alkyl groups such as methyl, ethyl and the like as well as halogen-substituted alkyl groups, aryl groups such as phenyl and alkenyl groups such as vinyl, allyl and the like. The organochlorosilanes are represented by the general formula $R_nSiCl_{4-n}$, where R is the above defined organic group and n is an integer of 1, 2 or 3. Several of the examples of the organochlorosilanes in conformity with the above formula are: dimethyldichlorosilane, vinylmethyldichlorosilane, diphenyldichlorosilane, trimethylchlorosilane and the like. In addition, one or more of the organic groups R in the organochlorosilane may be replaced with hydrogen atoms directly bonded to the silicon atom. Examples of such organohydrogenchlorosilanes are: methyldichlorosilane, dimethylchlorosilane and the like. These chlorosilanes are used either singly or as a mixture of two kinds or more according to the organosiloxanes desired.

The proportion of the feed rates of the organochlorosilane and the methyl alcohol into the reaction medium is not particularly restrictive although the stoichiometry of the reaction requires that the amount of methyl alcohol should be equimolar to the silicon-bonded chlorine atoms in the organochlorosilane according to the reaction equation. In this connection, the feed rate of methyl alcohol should be substantially equimolar to the silicon-bonded chlorine atoms in the silane to be introduced simultaneously into the reaction medium and the molar ratio of methyl alcohol to the silicon-bonded chlorine atoms is preferably in the range from 0.5 to 3.0 or, more preferably, from 1.0 to 2.5.

The reason for the above defined range of the molar ratio of the methyl alcohol to the silicon-bonded chlorine atoms with excess of the former over equimolar is that, when the organochlorosilane is introduced into the reaction medium in a feed rate to give an excess amount of the silicon-bonded chlorine atoms over equimolar to the methyl alcohol, the concentration of hydrogen chloride in the aqueous reaction medium gradually increases eventually to exceed the azeotropic concentration so that the loss of hydrogen chloride by dissipation into the gaseous phase together with the vapor of water is markedly increased with a decrease in the yield of methyl chloride. Therefore, a great economical disadvantage is caused due to the difficulty in the recovery and recycling of the thus dissipated hydrogen chloride.

On the other hand, the excess supply of methyl alcohol over the organochlorosilane is a favorable condition to increase the reaction velocity of the formation of methyl chloride with an increased concentration of methyl alcohol in the aqueous reaction medium. It is of course that the dissipation of methyl alcohol from the reaction medium into the gaseous phase is increased with the increase in the concentration thereof in the medium but it is a relatively easy matter to recover and recycle methyl alcohol carried out by the water vapor and the methyl chloride formed by the reaction. In short, a stationary state is established after a time a continuous operation of the process in which the methyl alcohol introduced into the reaction medium in an excess amount is continuously vaporized out of the reaction medium to be recovered and recycled. The upper limit of the feed rate of methyl alcohol relative to the organochlorosilane is given in consideration of the increase in the formation of dimethyl ether as the undesirable by-product as well as the difficulty in maintaining the reacton temperature in the preferred range due to the increased concentration of methyl alcohol in the aqueous reaction medium.

When the organochlorosilane and methyl alcohol are introduced into the gaseous reaction medium each in the form of vapor, the overall heat balance in the reaction system is exothermic due to the large quantity of the latent heat contained in the vapors so that it is sometimes necessary to undertake a cooling means either inside the reaction medium or outside the reaction vessel containing the reaction medium. When both of the reactants are introduced into the reaction medium each in the liquid form, the overall heat balance in the reaction system is endothermic so that heating means must be provided to heat up the aqueous reaction medium to the preferred temperature range.

The above described counteractive heat balance in the exothermic and endothermic systems leads to an advantage that, when either one or a part of the organochlorosilane and/or methyl alcohol is introduced into the reaction medium in the form of vapor with the balance being introduced in the liquid form, compensation in the heat balance between the exothermic and endothermic systems each for the other is obtained so that the thermal energy required for the control of the reaction can be minimized. This is the reason that the reactants should be introduced into the reaction medium at least in the vaporized form in addition to the problem, though less significant, that the organosiloxane product may contain increased amounts of organopolysiloxanes of relatively large molecular weights when the reactants are introduced into the aqueous reaction medium in their liquid forms.

The aqueous reaction medium into which the reactants of the organochlorosilane and methyl alcohol are introduced in the inventive process comprises methyl alcohol and hydrogen chloride. These components, however, are not necessarily contained in the aqueous medium at the very beginning of the operation of the inventive process but the operation may be started with pure water as the reaction medium by introducing the organochlorosilane and methyl alcohol thereinto. In this case, hydrogen chloride is formed by the hydrolysis of the organochlorosilane and methyl alcohol is absorbed by the water so that the concentrations of hydrogen chloride and methyl alcohol gradually increase until a stationary state is established in the reaction medium. It is of course optional to start the operation of the process with an aqueous reaction medium already containing hydrogen chloride and methyl alcohol added in advance to obtain early establishment of the stationary state in the reaction medium.

The temperature of the aqueous reaction medium should be kept in the range from 70° to 150° C. since no satisfactorily high reaction velocity is obtained for the formation of methyl chloride at a temperature lower than 70° C. while the reaction carried out at a temperature higher than 150° C. is undesirable due to the quality of the organosiloxane product containing increased amounts of relatively high molecular organopolysiloxanes as well as due to the increased amount of dimethyl either formed as the by-product.

The concentration of methyl alcohol in the aqueous reaction medium is not particularly limitative but usually should be kept in the range from 0.5 to 40% by weight. Higher concentrations of methyl alcohol than above are preferred from the standpoint of the reaction velocity for the formation of methyl chloride though being accompanied by a disadvantage that the formation of dimethyl ether as the by-product is increased in addition to the difficulty in maintaining and controlling the temperature of the reaction medium in the above defined preferable range. Lower concentrations of methyl alcohol than above in the reaction medium are of course disadvantageous by the decreased reaction velocity for the formation of methyl chloride. In other words, the feed rate of methyl alcohol to the aqueous reaction medium should be sufficiently high to give the above defined concentration thereof when a stationary state has been established in the reaction medium.

The pressure of the reaction system under operation should be sufficient to maintain the temperature of the reaction medium in the range from 70° to 150° C. but should not be too high because an excessively high pressure to the reaction system necessarily leads to an excessively high concentration of hydrogen chloride in the reaction medium. The pressure is usually controlled in the range from atmospheric to about 10 kg/cm$^2$G or, preferably, from atmospheric to 5 kg/cm$^2$G although higher pressures are advantageous in order to obtain higher reaction velocity for the formation of methyl chloride provided that the problem of the requirement for a more pressure-resistant reaction vessel can be set aside.

In the introduction of the organochlorosilane and methyl alcohol as the reactants into the aqueous reaction medium, it is a preferable condition that the reaction medium is not agitated by an outer agitating means so that the bubbles of the reactant vapors or the droplets of the reactant liquids ascend smoothly in the reaction medium without causing up-and-down turbulent flow of the reaction medium in the reaction vessel so as not to unduly disturb the above described localized conditions in the temperature and concentrations of hydrogen chloride and methyl alcohol at the surface of the vapor bubbles or liquid droplets ascending in the reaction medium. Otherwise the space-time yield for the formation of methyl chloride is somewhat adversely influenced.

An essential condition in the inventive process is that the concentration of hydrogen chloride in the reaction medium does not exceed the azeotropic concentration under the conditions of temperature and pressure at which the process is operated at least at or in the vicinity of the surface of the aqueous reaction medium. When the concentration of hydrogen chloride in the reaction medium exceeds the azeotropic, the amount of hydrogen chloride dissipated into the gaseous phase is remarkably increased as carried by the methyl chloride or the water vapor adversely influencing the yield of the methyl chloride as the product. In other words, the feed rates of the organochloroislane and methyl alcohol should be controlled to satisfy the above condition in the concentration of hydrogen chloride in the reaction medium at the temperature and/or under the pressure of the operation. At any rate, the concentration of hydrogen chloride should be kept at 25% by weight or below.

The process of the present invention will be more clear by the following description with reference to the accompanying drawing illustrating the process by a block diagram.

In the FIGURE, the aqueous reaction medium 1 is contained in the reaction vessel 2, which may be either of a form of a tank or of the form of a column, and the reactants, i.e. an organochlorosilane and methyl alcohol, are introduced into the reaction medium 1 at or near the bottom of the reaction vessel 2 either in the liquid form or in the vapor form. To give the description for the case of the introduction in the vapor form of the reactants, the organochlorosilane and methyl alcohol stored in respective storage tanks (not shown in the FIGURE) are sent to the respective evaporators 3 and 4 through the pipings 5 and 6, respectively, and at least partly evaporated there into vapors or a mixture of vapor and liquid. The vapors are each introduced through the piping 7 or 8 into the aqueous reaction medium 1 contained in the reaction vessel 2 at or near the bottom of the vessel 2.

Needless to say, the feed rates of the reactants into the reaction medium 1 are limited by the volume of the reaction medium 1 and preferably the feed rates of the reactants should be such that the rate of formation of methyl chloride does not exceed 1 kilomole/hour per 100 liter volume of the aqueous reaction medium 1. In other words, it is preferable that the amount of supply of the organochlorosilane for each hour should be such that the molar content of the silicon-bonded chlorine atoms is 1 kilomole or less per 100 liters of the aqueous reaction medium 1 and the feed rate of methyl alcohol is determined to give the desired molar ratio to the silane. When the feed rates of the reactants are in excess of the above limits, some difficulties are encountered in maintaining the temperature of the reaction medium 1 in the preferred range. In an extreme case, the reactant vapors in the ascending bubbles may escape into the gaseous phase above the reaction medium 1 before completion of the reaction. It is also important that the aqueous reaction medium 1 contained in the vessel 2 has a sufficient depth so that the reaction has been completed before the bubbles of the reactant vapors reach the upper surface of the medium 1. In this respect, the depth of the reaction medium 1 should be at least about 1 meter but an excessively large depth over several meters has no additional advantages or rather is undesirable due to the decrease in the space-time yield.

It is sometimes advantageous that the reaction vessel 2 is provided with one or more of horizontal partition plates in the aqueous reaction medium 1 so that the intermixing of the reaction medium 1 between the lower and upper portions or the up-and-down flow of the reaction medium 1 in the vessel 2 is prevented and the concentration of hydrogen chloride in the upper portion of the reaction medium 1 can be kept low irrespective of the concentration thereof in the lower portion resulting in further improved results of the process.

After a time of continuous introduction of the reactants into the aqueous reaction medium, a stationary state is established in the reaction vessel 2 and the orgnosiloxanes and methyl chloride are produced. Methyl chloride in the gaseous state and discharged out of the reaction vessel 2 as it leaves the reaction medium 1 while the organosiloxanes are either in the gaseous state or in the liquid state according to the molecular weight or of the component organopolysiloxanes and the conditons of the temperature and pressure. It is desirable that the orgnosiloxane product is taken out of the reaction vessel 2 as soon as possible after its formation in the reaction medium 1 before the polymerization by condensation or rearrangement takes place into larger molecules of the organopolysiloxanes. Therefore, the organosiloxane product in the gaseous state is discharged out of the vessel 2 together with methyl chloride and water vapor through the piping 9 at the upper part of the vessel 2. When the organosiloxane product is in the liquid form, the siloxane product forms a layer floating on the surface of the aqueous reaction medium 1 by virtue of the difference in the specific gravities to be discharged out of the reaction vessel 2 by overflowing through the piping 10 together with some volume of the aqueous reaction medium 1 into the liquid separator 11. The aqueous reaction medium separated from the liquid organosiloxane product in the liquid separator 11 is sent back to the bottom of the reaction vessel 2 through the piping 12 by means of a pump 13. Care must be taken in this case that the recycling feed of the aqueous reaction medium through the piping 12 does not excessively disturb the stationary state established in the reaction vessel 2 by the up-and-down flow caused thereby. The organosiloxane product separated from the aqueous medium in the liquid separator 11 is transferred to the separation tank 14 through the piping 15.

On the other hand, the product of methyl chloride taken out of the reaction vessel 2 in the gaseous form through the piping 9 is introduced into the reflux condenser 16. In the reflux condenser 16, the vapors of water, methyl alcohol and the vaporized portion of the organosiloxane product accompanying the methyl chloride are at least partly condensed and refluxed into the reaction vessel 2. It is important in this case that the water vapor is condensed and refluxed not totally but a part of the water vapor corresponding to the amount of water formed by the reaction is left uncondensed and sent to the recovery condenser 17 through the piping 18 together with methyl chloride gas and the uncondensed portions of methyl alcohol and the organosiloxane product in order that the amount of water in the aqueous reaction medium 1 in the reaction vessel 2 is kept constant. The uncondensed vapors of water, methyl alcohol and organosiloxane product are condensed in the recovery condenser 17 to be separated from the gas of methyl chloride and introduced into the separation tank 14 through the piping 19 to join there with the liquid organosiloxane product coming from the liquid separator 11. The organosiloxane product thus collected in the separation tank 14 is separated there from the aqueous phase containing methyl alcohol and transferred into the storage tank 20 through the piping 21 to be subjected to further purification processes by distillation and the like while the aqueous phase separated from the organosiloxane product in the separation 14 is discharged out of the tank 14 and discarded or, if necessary, subjected to a process for the recovery of methyl alcohol and hydrogen chloride contained therein. The organosiloxane product thus obtained usually contains a small smount of methyl chloride dissolved therein but the recovery of methyl chloride in such a dissolved state is an easy matter, for example, by heating the organosiloxane product.

The gaseous methyl chloride separated in the recovery condenser 17 from the condensates of water, methyl alcohol and vaporized portion of the organosiloxane product is introduced into the low-temperature condenser 22 through the piping 23 where it is liquefied and sent therefrom to the reservoir tank 24 through the piping 25 to be stored therein before it is used as the reactant material for the preparation of methylchlorosilanes by the reaction with metallic silicon in the so-called direct synthesis method.

Following is a summary of the advantages obtained in the process of the present invention.

(1) The process of the invention is carried out without the use of any catalyst so that it is completely free from the economical disadvantages and from the problem of the contamination of the products by the catalyst components unavoidable in the prior art methods using large amounts of catalysts.

(2) The space-time yield for the production of methyl chloride is much larger than in the conventional processes so that a great advantage is obtained in this respect since the space-time yield is one of the largest parameters influencing the economy of the facilities for the reaction. In the inventive process, the space-time yield for methyl chloride can be as large as 500 kg/m$^3$.-hour or larger, which value is about 20 times larger than the value in the conventional method using no catalyst and at about the same level as in the method using a quaternary ammonium salt as the catalyst.

(3) The yield of the methyl chloride by the reaction of hydrogen chloride and methyl alcohol is remarkably high in comparison with conventional processes. Even with a relatively low concentration of hydrogen chloride in the reaction medium, a sufficiently high economically feasible space-time yield is obtained for methyl chloride. The water distilled out as accompanied by the methyl chloride contains almost no hydrogen chloride indicating that the hydrogen chloride formed by the hydrolysis of the organochlorosilane is almost completely utilized for the formation of methyl chloride by a single pass through the reaction vessel to give an extremely high conversion of the chlorine content. When the utilization of hydrogen chloride is at a low level and the water distilling out contains a considerable amount of hydrogen chloride, the hydrogen chloride can be separated from water and recovered only in a complicated system for the azeotropic distillation with consumption of large quatities of energies.

(4) The amount of dimethyl ether as the by-product formed in a side reaction is as small as 0.5% by weight or less based on the yield of the methyl chloride product. In a prior art process using no catalyst, this percentage is, for example, in the range from 1.7 to 3.5% owing to the remarkably high concentration of methyl alcohol in the reaction mixture and the amount of dimethyl ether is still larger reaching 13% by weight or more in a prior art process using a Lewis acid as the catalyst since Lewis acids are also active to accelerate the side reaction for the formation of dimethyl ether as the by-product. The formation of dimethyl ether is undesirable due to the decreased utilization of methyl alcohol so much in addition to the problem that dimethyl ether can be separated from methyl chloride with large costs since the boiling points of them are close to each other.

(5) The organosiloxane product obtained by the inventive process contains organopolysiloxanes of relatively low molecular weight in a large proportion. When the starting organochlorosilane is a diorganodichlorosilane, in particular, the organosiloxane product contains in a high proportion the low molecular polysiloxanes of cyclic structure useful as an important basic intermediate for the manufacture of silicone rubbers and the like silicone products. In addition, the organosiloxane product containing large amounts of cyclic polysiloxanes has a relatively low viscosity so that such a product can be handled with ease.

In the following, several examples are given illustrating the process of the present invention performed according to the disclosure given above.

EXAMPLE 1

An aqueous mixture containing methyl alcohol and hydrogen chloride was charged into a reactor column of Pyrex glass having an inner diameter of 50 mm and a capacity of 2000 ml and equipped with an overflow outlet tube at the upper part thereof. The position of the overflow outlet tube was at such a height that the reactor column could contain about 1600 ml of the aqueous reaction medium. The overflow outlet tube was connected to a liquid separator of 1000 ml capacity, which was also filled with the same aqueous mixture containing methyl alcohol and hydrogen chloride. Both of the reactor column and the liquid separator were heated outwardly.

The pressure inside the above reaction system was kept at 1.5 kg/cm$^2$G and, when the temperature of the aqueous reaction medium had reached 100° C., a pump was brought into operation to circulate the reaction medium between the reactor column and the liquid separator through the overflow outlet tube along with the start of supplying of dimethyldichlorosilane and methyl alcohol each in the form of vapor into the reaction medium through a nozzle at the bottom of the reactor column. The feed rate of dimethyldichlorosilane after evaporation in an evaporator and sent by means of a metering pump was 516 g/hour while the feed rate of methyl alcohol introduced similarly was 375 g/hour.

As the introduction of the reactants in the above described manner was continued to reach a stationary state established in the reaction system, methyl chloride, dimethylsiloxane product, water and a small amount of dimethyl ether were formed in the reaction medium. The dimethylsiloxane product floating in a layer on the aqueous reaction medium was discharged out of the reactor column through the overflow outlet tube together with a volume of the aqueous reaction medium and introduced into the liquid separator to be subjected to phase separation. The aqueous phase separated in the liquid separator was recycled and introduced into the reactor column at the bottom thereof by means of a pump.

On the other hand, the methyl chloride formed in the reaction medium was discharged out of the reactor column at the upper part thereof and introduced into the recovery codenser through the reflux condenser. Although the gas of methyl chloride coming out of the reactor column carried hydrogen chloride together with vapors of the dimethylsiloxane, water and methyl alcohol, the amount of hydrogen chloride reaching the recovery condenser was negligibly small since hydrogen chloride was returned to the reactor column as carried by the refluxing liquid obtained by the partial condensation of the vapors of the dimethylsiloxane, water and methyl alcohol in the reflux condenser.

The vapors of the dimethylsiloxane, water and methyl alcohol uncondensed in the reflux condenser and transferred into the recovery condenser together with the gas of methyl chloride were liquefied there and introduced into a separation tank. The amount of the thus condensed water approximately corresponded to the water formed in the reaction medium by the reaction. The methyl chloride still uncondensed in the recovery condenser was led to a low-temperature condenser where it was liquefied and stored in a reservoir tank in the liquid form.

In the separation tank which received the dimethylsiloxane product coming from the liquid separator and the condensed portions of water, methyl alcohol and vaporized dimethylsiloxane product coming from the recovery condenser, the dimethylsiloxane product was separated from the aqueous phase and sent to and stored in a storage tank following heat treatment for removing the methyl chloride dissolved therein. The methyl chloride thus evaporated from the dimethylsiloxane product was liquefied in the low-temperature condenser and added to the reservoir tank for methyl chloride. The aqueous phase separated from the dimethylsiloxane product in the separation tank was subjected to the separation of methyl alcohol which could be recycled to the reactor column.

When a stationary state had been established in the reaction column after a time of continuous operation in the above described manner, the temperature of the reaction medium was 112° C. and the concentrations of hydrogen chloride and methyl alcohol in the reaction medium were 17% by weight and 6% by weight, respectively. The rates of introduction of water, methyl alcohol and hydrogen chloride into the separation tank were 72.4 g/hour, 116.5 g/hour and 0.1 g/hour, respectively.

As a result of the above operation, the dimethylsiloxane product was obtained at a rate of 295 g/hour which was approximately equal to the theoretical yield calculated from the feed rates of the starting dimethyldichlorosilane and methyl alcohol. The viscosity of this dimethylsiloxane product was 4.3 centistokes at 25° C. and the product contained 62% by weight of dimethylpolysiloxane constituents having cyclic structure with acidic impurities in an amount corresponding to 69 p.p.m. of hydrogen chloride. On the other hand, the methyl chloride product was obtained at a rate of 405 g/hour and the content of dimethyl ether therein was 0.4% by weight.

The net consumption of methyl alcohol calculated from the feed rate minus the rate of recycling was 258.5 g/hour. The conversion of the chlorine content in the consumed dimethyldichlorosilane into methyl chloride was 99.7% while the conversion of the methyl groups in the net consumption of methyl alcohol into methyl chloride was 98.8% although the one-pass conversion of the methyl groups into methyl chloride was 68.1% without consideration of the recycled amount of methyl alcohol. The spacetime yield for the formation of methyl chloride was 252 kg/m$^3$·hour calculated for 1600 ml volume of the aqueous reaction medium.

EXAMPLE 2

The procedure for operating the reaction system was substantially the same as in the preceding example except that the feed rate of methyl alcohol was reduced to 257 g/hour and the refluxing condenser was operated under a condition of total refluxing for the vapors of the dimethylsiloxane, water, methyl alcohol and hydrogen chloride entering it as accompained by the methyl chloride gas.

In order to compensate for the accumulation of water formed by the reaction and keep the volume of the aqueous reaction medium circulating in the circuit of the reactor column and the liquid separator under the above undertaken condition of total refluxing, a part of the aqueous reaction medium was discharged out of the bottom of the liquid separator at a constant rate corresponding to the formation of water in the reactor column.

At the stationary state established in the reaction system, the temperature of the reaction medium in the reactor column was 112° C. and the concentrations of hydrogen chloride and methyl alcohol in the aqueous reaction medium were 15.1% by weight and 7.2% by weight, respectively. The dimethylsiloxane product was obtained at a rate of 295 g/hour. The viscosity of this dimethylsiloxane product was 4.6 centistokes at 25° C., which contained 65% by weight of cyclic components and acidic matters in an amount corresponding to 85 p.p.m. of hydrogen chloride. On the other hand, methyl chloride was obtained at a rate of 389 g/hour and the content of dimethyl ether therein was 1.2% by weight.

As is mentioned above, the volume of the aqueous reaction medium was kept constant by discharging the aqueous medium from the bottom of the liquid separator at a rate of 90.6 g/hour necessarily with the losses of hydrogen chloride and methyl alcohol as contained in the aqueous medium in the percentages given above.

The conversion of the chlorine content in the consumed dimethyldichlorosilane into methyl chloride was 95.1% and the conversion of the methyl groups in the consumed methyl alcohol into methyl chloride was 94.8%. The space-time yield for the formation of methyl chloride was 238 kg/m$^3$·hour.

EXAMPLE 3

The procedure for the reaction of dimethyldichlorosilane and methyl alcohol was substantially the same as in Example 1 except that the feed rate of methyl alcohol was reduced to 260 g/hour and the mixture collected in the separation tank and composed of the dimethylsiloxane product containing methyl chloride in a small amount, water, methyl alcohol and hydrogen chloride was supplied to a distillation column of 50 mm inner diameter and 1000 mm height with packings of 10 mm Raschig rings, from which a portion of the distillate composed of methyl chloride, methyl alcohol and a small volume of water was recycled to the reactor column while the dimethylsiloxane product obtained at the column bottom was taken out and stored in the storage tank.

As a result, the dimethylsiloxane product was obtained at a rate of 295 g/hour. The viscosity of this dimethylsiloxane product was 6.4 centistokes at 25° C. and it contained 67.7% by weight of the cyclic components and acidic matters in an amount corresponding to 2 p.p.m. of hydrogen chloride. On the other hand, methyl chloride was obtained at a rate of 405 g/hour and the content of dimethyl ether therein was 0.5% by weight.

The conversion of the chlorine content in the consumed dimethyldichlorosilane into methyl chloride was 99.8% while the conversion of the methyl groups in the consumed methyl alcohol into methyl chloride was 98%. The space-time yield for the formation of methyl chloride was 252 kg/m$^3$·hour.

EXAMPLE 4

The reaction of dimethyldichlorosilane and methyl alcohol was undertaken in substantially the same manner as in Example 1 except that the feed rates of dimethyldichlorosilane and methyl alcohol were increased to 941 g/hour and 754 g/hour, respectively. The temperature of the aqueous reaction medium at the stationary state was 112° C. and the concentrations of hydrogen chloride and methyl alcohol in the aqueous reaction medium were 19.5% by weight and 10% by weight, respectively.

As a result, the dimethylsiloxane product was obtained at a rate of 540 g/hour. The viscosity of this product was 4.9 centistokes at 25° C. and it contained 64.5% by weight of the cyclic components. On the other hand, methyl chloride was obtained at a rate of 732 g/hour and the content of dimethyl ether therein was 0.8% by weight.

The conversion of the chlorine content in the consumed dimethyldichlorosilane into methyl chloride was 98.6% while the conversion of the methyl groups in the consumed methyl alcohol into methyl chloride was 98.0% although the one-pass conversion of the methyl groups was 61.0%. The space-time yield for the formation of methyl chloride was 456 kg/m$^3$·hour.

EXAMPLE 5

The reaction of dimethyldichlorosilane and methyl alcohol was undertaken in substantially the same manner as in Example 2 except that the pressure inside the reactor column was atmospheric, the temperature of the aqueous reaction medium in the column was 88° C. and the feed rate of methyl alcohol was slightly increased to 260 g/hour. The concentrations of hydrogen chloride and methyl alcohol in the aqueous reaction medium at the stationary state were 24.2% by weight and 23% by weight, respectively.

As a result, the dimethylsiloxane product was obtained at a rate of 296 g/hour. The viscosity of this product was 4.9 centistokes at 25° C. and it contained 61.7% by weight of the cyclic components. On the other hand, methyl chloride was obtained at a rate of 357 g/hour and the content of dimethyl ether therein was 1.7% by weight.

The conversion of the chlorine content in the consumed dimethyldichlorosilane into methyl chloride was 86.7% and the conversion of the methyl groups in the consumed methyl alcohol was 85.5%. The space-time yield for the formation of methyl chloride was 219 kg/m$^3$·hour.

EXAMPLE 6

The reaction of dimethyldichlorosilane and methyl alcohol was conducted in substantially the same manner as in Example 2 except that each of the reactants was introduced into the reactor column in the form of liquid by omitting the evaporator. The temperature of the aqueous reaction medium at the stationary state was kept at 112° C. by use of an outer heating means and the concentrations of hydrogen chloride and methyl alcohol in the aqueous reaction medium were 17.3% by weight and 6.6% by weight, respectively.

As a result, the dimethylsiloxane product was obtained at a rate of 296 g/hour. The viscosity of this product was 7.4 centistokes at 25° C. and it contained 43.9% by weight of the cyclic components and acidic matters in an amount corresponding to 310 p.p.m. of hydrogen chloride. On the other hand, methyl chloride was obtained at a rate of 385 g/hour and the content of dimethyl ether therein was 1% by weight.

The conversion of the chlorine content in the consumed dimethyldichlorosilane into methyl chloride was 94.3% and the conversion of the methyl groups in the consumed methyl alcohol was 94.0%. The space-time yield for the formation of methyl chloride was 238 kg/m$^3$·hour.

EXAMPLE 7

The reaction of trimethylchlorosilane instead of dimethyldichlorosilane and methyl alcohol was undertaken in substantially the same manner as in Example 2. The feed rate of trimethylchlorosilane was 868 g/hour. The temperature of the aqueous reaction medium at the stationary state was 112° C. and the concentrations of hydrogen chloride and methyl alcohol therein were 15.0% by weight and 7.3% by weight, respectively.

As a result, hexamethyldisiloxane and methyl chloride were obtained at rates of 647 g/hour and 386 g/hour, respectively, and the content of dimethyl ether in the methyl chloride was 1.2% by weight.

The conversion of the chlorine content in the consumed trimethylchlorosilane into methyl chloride was 94.4% and the conversion of the methyl groups in the consumed methyl alcohol into methyl chloride was 94.0%. The space-time yield for the formation of methyl chloride was 238 kg/m$^3$·hour.

EXAMPLE 8

The reaction of vinylmethyldichlorosilane instead of dimethyldichlorosilane and methyl alcohol was undertaken in a similar manner to Example 1. The feed rates of vinylmethyldichlorosilane and methyl alcohol were 564 g/hour and 384 g/hour, respectively. The temperature of the aqueous reaction medium at the stationary state was 112° C. and the concentrations of hydrogen chloride and methyl alcohol therein were 17.2% by weight and 6.5% by weight, respectively.

As a result, the vinylmethylsiloxane product was obtained at a rate of 340 g/hour. The viscosity of this product was 4 centistokes at 25° C. and it contained 70% by weight of cyclic vinylmethylpolysiloxanes and acidic matters in an amount corresponding to 200 p.p.m. of hydrogen chloride. On the other hand, methyl chloride was obtained at a rate of 405 g/hour and the content of dimethyl ether therein was 0.5% by weight.

The conversion of the chlorine content in the consumed vinylmethyldichlorosilane into methyl chloride was 99.7% while the conversion of the methyl groups in the consumed methyl alcohol into methyl chloride was 66.5%. The space-time yield for the formation of methyl chloride was 252 kg/m$^3$·hour.

What is claimed is:

1. A process for concurrently producing methyl chloride and organosiloxanes from an organochlorosilane and methyl alcohol in a continuous operation which comprises introducing simultaneously the organochlorosilane and methyl alcohol in such a proportion that the amount of introduction of the methyl alcohol is substantially equimolar to the silicon-bonded chlorine atoms in the organochlorosilane into an aqueous reaction medium comprising methyl alcohol and hydrogen chloride kept at a temperature of 70° to 150° C. and under a pressure of atmospheric or higher and contained in a reaction vessel at or near the bottom thereof, the rates of introduction of the organochlorosilane and methyl alcohol being controlled such that the concentration of hydrogen chloride in the aqueous reaction medium does not substantially exceed the azeotropic concentration at the temperature and under the pressure of operation at least at or in the vicinity of the surface of the aqueous reaction medium.

2. The process as claimed in claim 1 wherein the concentration of methyl alcohol in the aqueous reaction medium is in the range from 0.5 to 40% by weight.

3. The process as claimed in claim 1 wherein the pressure is in the range from atmospheric to about 10 kg/cm$^2$G.

4. The process as claimed in claim 1 which further comprises discharging the organosiloxanes in the form of liquid formed by the reaction of the organochlorosilane and methyl alcohol in the aqueous reaction medium out of the reaction vessel together with a portion of the aqueous reaction medium, separating the thus discharged aqueous reaction medium from the organosiloxanes and recycling the thus separated aqueous reaction medium to the reaction vessel.

5. The process as claimed in claim 4 wherein the aqueous reaction medium separated from the organosiloxanes is recycled to the reaction vessel after subtracting a portion corresponding to the amount of water formed by the reaction of the organochlorosilane and the methyl alcohol.

6. The process as claimed in claim 1 which further comprises introducing the methyl chloride in the form of gas formed in the aqueous reaction medium by the reaction of the organochlorosilane and methyl alcohol into a reflux condenser together with the vapors of water, methyl alcohol and hydrogen chloride evaporated from the aqueous reaction medium, partially condensing the vapors to reflux the liquefied portion of the aqueous reaction medium and discharging the uncondensed portion of the vapors out of the reflux condenser together with the gas of methyl chloride, the amount of the uncondensed portion of the vapors being such that the content of water vapor therein is about the same as the amount of water formed in the aqueous reaction medium by the reaction of the organochlorosilane and methyl alcohol.

7. The process as claimed in claim 1 wherein the organochlorosilane and methyl alcohol are introduced into the aqueous reaction medium each in the form of vapor.

8. The process as claimed in claim 1 wherein the organochlorosilane and methyl alcohol are introduced into the aqueous reaction medium in the form of a mixture of vapor and liquid in such a proportion that the temperature of the aqueous reaction medium is maintained in the range from 70° to 150° C. without an outer heating means.

9. The process as claimed in claim 1 wherein the volume of the aqueous reaction medium is at least 100 liters per kilomole of the methyl chloride formed by the reaction of the organochlorosilane and methyl alcohol per hour.

10. The process as claimed in claim 1 wherein the rate of introduction of the methyl alcohol is in the range from 0.5 to 3.0 times by moles of the rate of introduction of the organochlorosilane calculated as the chlorine atoms bonded to the silicon atoms.

* * * * *